(12) United States Patent
Caccavale et al.

(10) Patent No.: US 7,062,113 B2
(45) Date of Patent: Jun. 13, 2006

(54) INTEGRATED OPTICAL CHIP

(75) Inventors: Federico Caccavale, Milan (IT); Luigi Gobbi, Milan (IT); Marco Marazzi, Pavia (IT); Gloria Obetti, Campsampiero (IT)

(73) Assignee: Corning Incorporated, Corning, NY (US)

( * ) Notice: Subject to any disclaimer, the term of this patent is extended or adjusted under 35 U.S.C. 154(b) by 189 days.

(21) Appl. No.: 10/666,505

(22) Filed: Sep. 19, 2003

(65) Prior Publication Data

US 2004/0057652 A1 Mar. 25, 2004

(30) Foreign Application Priority Data

Sep. 20, 2002 (EP) ................... 02078898

(51) Int. Cl.
*G02B 6/12* (2006.01)
(52) U.S. Cl. ........................................ 385/14
(58) Field of Classification Search .................... 385/1, 385/2, 8, 39, 129–132
See application file for complete search history.

(56) References Cited

U.S. PATENT DOCUMENTS 4,750,800 A 6/1988 Fournier et al. ......... 350/96.11
5,388,170 A 2/1995 Heismann et al. ............. 385/4
6,044,184 A 3/2000 Shafer et al. ................. 385/14
6,353,690 B1 3/2002 Kulishov .................... 385/10

FOREIGN PATENT DOCUMENTS

WO WO 91/03748 3/1991

OTHER PUBLICATIONS

Shaw et al. "Low Cost Packaging Techniques for Active Waveguide Devices" Electronics Components and Technology Conference, 2000, May 2000, pp. 742-748.*
"Electrical Loss Mechanisms In Traveling Wave LiNbO$_3$ Optical Modulators" G. K. Gopalakrishana, et al Electronics Letters, Jan. 16, 1992, vol. 28, No. 2.

* cited by examiner

*Primary Examiner*—Sarah Song
(74) *Attorney, Agent, or Firm*—Ronald J. Paglierani

(57) ABSTRACT

An integrated optical chip has a crystalline structure cut along parallel principal crystallographic planes and a thickness of less than 1.0 mm. An optical signal pathway is disposed generally longitudinally in one of the cut surfaces of the chip, and the chip is attached to a substrate material up to 1.0 mm thick and having similar coefficients of thermal expansion in that principal crystallographic plane. A grounding plane is disposed between the chip and substrate to provide an electrically conductive path between opposite lateral surfaces of the chip. A method of making the chip is also described.

22 Claims, 2 Drawing Sheets

INTEGRATED OPTICAL CHIP

BACKGROUND OF THE INVENTION

1. Field of the Invention

This invention relates to an integrated optical chip mounted on a substrate. In particular, the invention relates to thin integrated optical chip structures capable of operating at high frequencies in excess of 10 GHz.

2. Technical Background

The term "integrated optics" refers in general to a class of devices for guiding and controlling light in thin film layers or in narrow waveguiding channels formed in suitable dielectric materials (crystal or glass). Integrated optical devices include optical waveguides, switches, polarisers, amplitude and phase modulators, and other functional devices. In system applications, several functional units may be combined ("integrated") on a single crystalline or glass substrate (an "optical chip"), and the devices may be connected to sources, detectors or other optical devices, usually by means of optical fibre.

As the demand for telecommunications services and bandwidth has boomed, the need for, and advantages of, external modulation in fibre-optic transmission systems has been firmly established. Lithium niobate is today one of the most important dielectric materials in the field of integrated optics, both for research and for technological applications. This importance is due to the strong correlation between the optical properties of the crystal, its refractive index, and the application of electric fields (electro-optic effect) and sound waves (acousto-optic effect). Lithium niobate external modulators provide both the required bandwidth and a means for minimizing the effects of dispersion that limit system performance.

In order to improve the bandwidth, interest has increased in travelling wave electrode configurations, which achieve a close phase match between the optical and microwave signals. In lithium niobate Mach Zehnder interferometers, this has been achieved both by the use of a shielding plane and by the use of thick electrode structures. These devices have the potential for very broadband operation, but they are limited particularly by the electrical loss of the electrodes. One of the principal high frequency electrical loss mechanisms is attributed to a transverse resonance in the substrate of the chip. This effect has been observed with different electrode configurations and has been attributed to a coupling between the fundamental coplanar waveguide mode and a substrate mode—see "Electrical Loss Mechanisms in Travelling Wave $LiNbO_3$ Optical Modulators" by Gopalakrishnan, G. K.; Burns, W. K.; Bulmer, C. H.; *Electronics Letters*, 1992. The authors demonstrate by simulation and experiments that the frequency at which mode coupling begins varies with substrate thickness. In order to avoid mode coupling at frequencies of up to 10 GHz, a substrate thickness of 1.0 mm is satisfactory. However, in order to avoid mode coupling at frequencies greater than 40 GHz, a substrate thickness of less than 0.25 mm is necessary.

Because of their fragility, the manufacturing processes used in the production of optical modulators using thin substrates becomes critical in all phases, including chip separation, testing and handling during assembly processes. Moreover, test specifications require devices to be able to withstand shocks of 500 g (4900 m/s$^2$). Using lithium niobate chips with a substrate thickness of 0.5 mm, the Applicant has found that around 80% are damaged during assembly, with the remainder being destroyed during shock testing. Telcordia specifications also require devices to be subject to thermal shocks and cycles. Lithium niobate exhibits anisotropic thermal expansion properties: that is to say the dimensional changes in the material associated with temperature variations are different in each direction within the crystal. Typical values of coefficients of thermal expansion (CTE) for an X-cut chip are $15 \times 10^{-6}/°$ C. and $7 \times 10^{-6}/°$ C. in orthogonal directions in the same plane. Conventionally, stainless steel (CTE=$18 \times 10^{-6}/°$ C.) and an Fe—Ni—Co alloy known as Kovar™ (a trademark of Westinghouse Electric Corporation) (CTE=$5 \times 10^{-6}/°$ C.) have been used as substrates for mounting lithium niobate chips because their CTE values provide a close match to the CTE in selected directions of the lithium niobate. Although temperature induced stresses due to the mismatch of CTE in other directions are sustainable with $LiNbO_3$ chips of a thickness of around 1.0 mm, such stresses can lead to failure during thermal tests of the attachment between thinner lithium niobate chips and the substrate or to breakage of the brittle crystalline chip.

U.S. Pat. No. 4,750,800 describes a mounting structure for an integrated optical device chip wherein the mounting structure has similar thermal expansion properties to those of the chip in order to minimize stress transmission to the chip due to temperature fluctuations. Each individual chip is mounted on the substrate having a thickness at least ten times greater than the chip thickness.

A further problem of chip design arises due to the pyroelectric effect, in which a charge differential develops in an X-cut chip across the face of a chip due to thermal variation. Such a charge differential can lead to an electrical discharge which can cause errors and distortion to signals processed by the chip. The electrical field that produces the voltage differences across the surface of the chip is caused by any change in the bulk temperature of the chip. A temperature gradient across the chip is not required to produce a voltage difference due to the pyroelectric effect. This spontaneous electrical polarization directed only along the z-axis of the crystal is produced whenever the temperature of the chip is changed from one value to another. The relation between small temperature variations and polarization is linear.

U.S. Pat. No. 6,044,184 describes an integrated optical chip in which a surface is wholly or partially coated with a conductive coating to prevent a charge differential from developing across the surface. Conductive security dabs are used to increase reliability of the conductive paths at the edges of the surface joining the +and −Z faces of the chip.

There remains a need to provide a thin crystalline integrated optical chip which is robust and capable of operating at frequencies in excess of 10 GHz.

SUMMARY OF THE INVENTION

According to a first aspect of the invention, there is provided an integrated optical chip having a crystalline structure cut along parallel principal crystallographic planes and a thickness of less than 1.0 mm, an optical signal pathway being disposed generally longitudinally in one of the cut surfaces of the chip. The chip is attached to a substrate material having similar (compatible) coefficients of thermal expansion in the said principal crystallographic plane. A grounding plane disposed between the chip and substrate provides an electrically conductive path between opposite lateral surfaces of the chip, and the thickness of the substrate material is up to 1.0 mm.

The operative frequency of the integrated optical chip is lower than the mode coupling frequency. By disposing the grounding plane between the thin chip and the substrate, the transverse resonant frequency of the composite chip is maintained at a high value, enabling the chip to operate at high frequencies in excess of 10 GHz, while the composite chip-substrate structure retains improved strength for assembly and handling purposes. As a further effect, the electrically conductive path provided by the grounding plane between opposite exposed surfaces of the chip and substrate prevents a charge differential from developing across the surface of the chip, so avoiding pyroelectric effects.

Preferably the substrate material comprises the same material as that of the chip.

Alternatively, at least if the chip comprises lithium niobate, the substrate material may comprise a ceramic thermoset polymer composite.

The chip may be attached to the substrate with adhesive.

Preferably, the electrically conductive path comprises a metallised layer.

According to a second aspect of the invention, there is provided a method of manufacturing an integrated optical chip, the chip having a crystalline structure cut along parallel principal crystallographic planes and a thickness of less than 1.0 mm, an optical signal pathway being disposed in one of the cut surfaces of the chip. The method comprises the steps of forming at least one optical signal pathway in one surface of a crystalline wafer cut along parallel principal crystallographic planes, applying an electrically conductive layer to the opposite surface of the crystalline wafer to that of the optical signal pathway, attaching a substrate material slab on the metallised surface of the crystalline wafer, the slab having a thickness less than 1.0 mm and similar coefficients of thermal expansion in the said principal crystallographic plane, dicing an individual composite chip on substrate from the wafer-slab structure, the composite chip comprising a substrate and at least one optical signal pathway extending generally longitudinally with respect to the composite chip, and applying an electrically conductive path to the lateral surfaces of the composite chip.

Mounting the chip on the substrate prior to dicing the chip from the wafer-slab structure reduces the risk of breaking the chip as well as minimizing the number of dicing steps required.

The surface of the composite chip on which the optical signal pathway is formed and the longitudinal end surfaces between which the optical signal pathway extends may be masked prior to applying an electrically conductive path.

Additional features and advantages of the invention will be set forth in the detailed description which follows, and in part will be readily apparent to those skilled in the art from the description or recognized by practicing the invention as described in the written description and claims hereof, as well as the appended drawings. It is to be understood that both the foregoing description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention, and together with the description serve to explain the principles and operation of the invention.

DETAILED DESCRIPTION OF THE PREFERRED EMBODIMENTS

Figure 1:
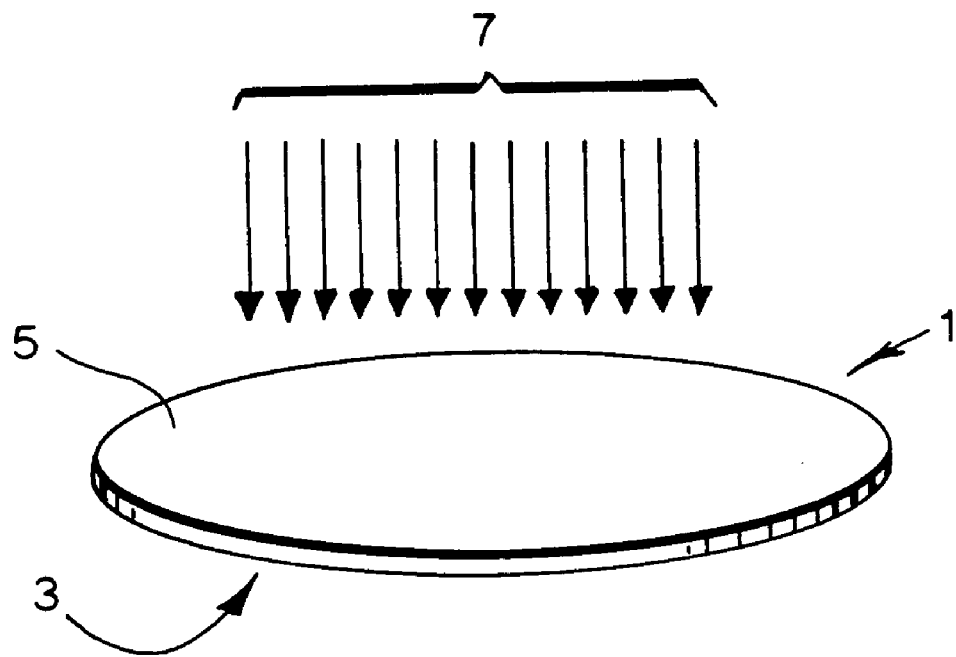
FIG. 1 is a schematic diagram showing deposition of a conductive coating on a thin lithium niobate wafer.

FIG. 1 shows a lithium niobate wafer 1 having a thickness of around 0.5 mm and on which have been formed a number of optical signal pathways with modulators in the lower surface 3 (as depicted) in a conventional manner known to those skilled in the art of integrated optical device manufacture. The wafer is cut with lower and upper surfaces 3, 5 lying along principal crystallographic planes. The upper surface 5 of the wafer is sputtered with an electrically conductive coating of titanium by means of electron beam evaporation as indicated by arrows 7 in FIG. 1. The evaporation process employs low background pressures of around $10^{-7}$ torr, a pre-evaporation step, and evaporation rates of 10–50 nm/min. This technique produces a mechanically stable and adherent metallic film a couple of hundred nm thick on the upper surface 5.

Figure 2:
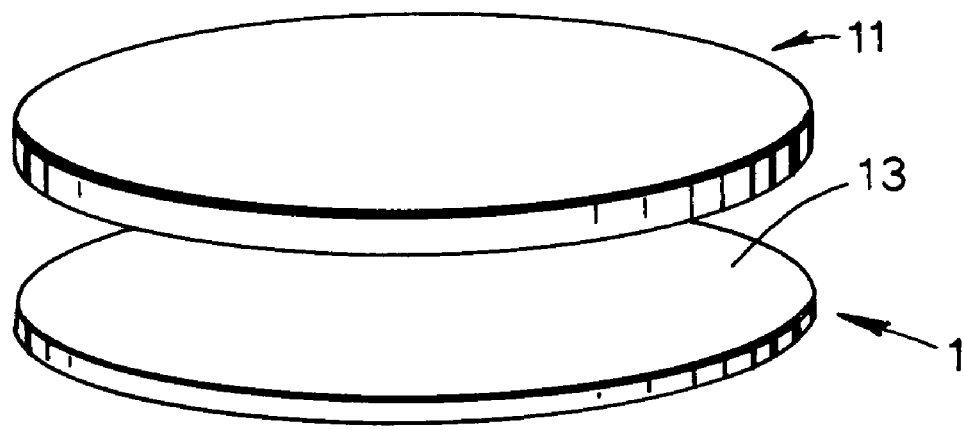
FIG. 2 is a schematic diagram showing bonding of the thin wafer of FIG. 1 to a suitable substrate slab.

After application of the conductive coating, a slab 11 comprising a second wafer of lithium niobate, also 0.5 mm thick and cut along the same crystallographic planes as the lithium niobate wafer 1, is attached to the latter with the same crystallographic orientation using Epotek 301/2™ epoxy resin as shown in FIG. 2, with the titanium coating 13 sandwiched between the wafer 1 and slab 11. The thickness of the resin is minimised to reduce the risk of separation or cracking between the wafer 1 and the slab 11.

Figure 3:
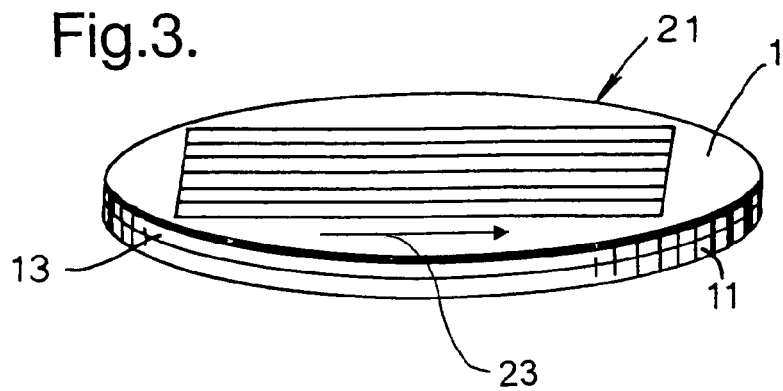
FIG. 3 is a schematic diagram showing a number of individual bonded chips on the wafer-slab structure of FIG. 2.
Figure 4:
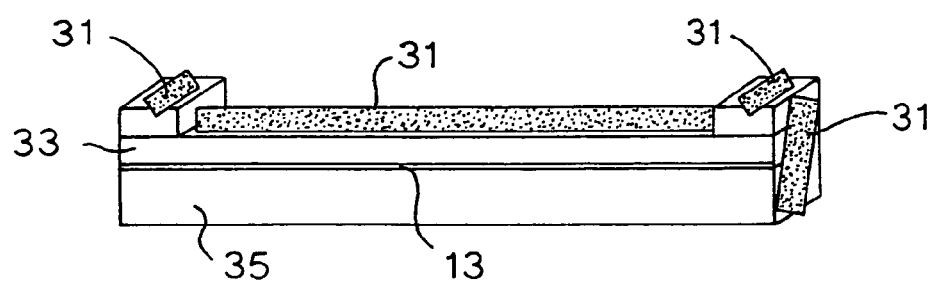
FIG. 4 is a schematic diagram showing masks on an individual bonded chip.
Figure 5:
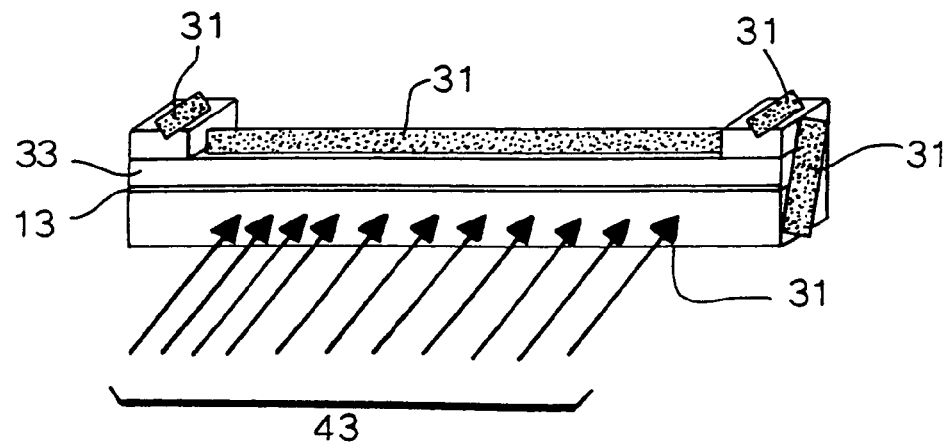
FIG. 5 is a schematic diagram showing deposition of a conductive coating on opposite sides of an individual bonded chip.

Individual composite chips on substrates 21 each comprising an optical signal pathway with modulator extending generally longitudinally as shown in FIG. 3 are then diced from the wafer-slab structure. The thickness of the wafer-slab structure is around 1.0 mm, which ensures that the structure is sufficiently robust to withstand the dicing process as well as subsequent assembly steps. Finally a further electrically conductive coating, this time comprising a composite layer of 100 nm of titanium and 200 nm of gold, is deposited on the lateral surfaces of the composite chip by the same electron beam evaporation process described above as indicated by arrows 43 in FIG. 5. Prior to coating, a photoresist mask 31 (FIG. 4) may be applied to the surface of the composite chip on which the optical signal pathway is formed and the longitudinal end surfaces between which the optical signal pathway extends, to leave the lateral surfaces of both the lithium niobate chip 33 and substrate 35 exposed. Alternatively, the chip may be mounted during the electron beam evaporation process such that only the lateral surfaces are exposed, the other surfaces lying in shadow with respect to the evaporation process.

The thin integrated optical chip so formed can operate at high frequencies in excess of 10 GHz, while the substrate to which it is bonded gives the composite chip structure a total thickness of around 1.0 mm which not only provides improved strength for assembly and handling purposes, but also provides sufficient strength to withstand thermo-mechanical shock testing at 500 g as described above. Temperature induced stresses due to a mismatch of CTE between the chip and substrate are eliminated by use of a substrate of the same material and crystallographic orientation as the chip. The electrically conductive coating 13 sandwiched between the chip 33 and substrate 35 prevents the thickness of the substrate 35 from affecting the transverse resonant frequency of the chip. Furthermore, the electrically conductive pathways provided between all exposed surfaces of the composite chip by virtue of the coating (grounding plane) 13 sandwiched between the chip 33 and substrate 35, and the metallised layers applied to the lateral surfaces of the chip 33 and substrate 35, prevent development of charge differentials across the surfaces of the composite structure and so reduce the errors and distortions (bias drift) that can otherwise arise during operation of the chip due, for example, to the pyroelectric effect. As a result, significant improvements are observed in terms of yield from the manufacturing process, and mechanical reliability of the optical chip.

Lithium niobate represents the best choice of material for the substrate of a lithium niobate chip as described above since it provides identical CTE values to those of the wafer 1, to minimise thermal strain of the composite chip. However, it will be clear to those skilled in the art of integrated optical chip design that the invention described herein may be equally applicable to integrated optical chips made of other materials. Furthermore, alternative insulating materials having CTE values at least similar to those of the wafer 1 in the longitudinal direction of the individual bonded chips (as depicted by the arrow 23 in FIG. 3) might also be suitable for the material of the slab 11. Alternative materials suitable for use with lithium niobate chips include a temperature stable ceramic/thermoset polymer composite sold under the trademark TMM6 by Rogers Corporation, Chandler, Ariz., USA.

The electron beam evaporation process described above is used to produce conductive coatings of titanium and gold because both are easily evaporated due to their low vapour deposition pressures and have low electrical resistivities, titanium providing good adhesion with respect to lithium niobate, and gold preventing oxidation of the titanium. However, the process could equally be used for conductive coatings of aluminium, nickel, chromium or tungsten, all of which would be suitable for this purpose. Alternatively, thin films of titanium, gold or tungsten could be applied using a sol-gel process. Other options for applying a conductive coating to the wafer will be apparent to those skilled in the art of semiconductor fabrication, and include thermal curing of materials such as conductive epoxy resins, or use of electrically conductive gels obtained by the galvanoplastic process.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

The invention claimed is:

1. Integrated optical chip having a crystalline structure cut along parallel principal crystallographic planes and a thickness of less than 1.0 mm, an optical signal pathway being disposed generally longitudinally in one of the cut surfaces of the chip, wherein the chip is attached to a substrate material having the same crystallographic orientation as the chip and having similar coefficients of thermal expansion in the said principal crystallographic plane, characterised by a grounding plane disposed between the chip and substrate and in direct contact with the chip, said grounding plane both providing an electrically conductive path between opposite lateral surfaces of the chip and preventing the substrate from affecting the transverse resonant frequency of the chip, and the thickness of the substrate material being up to 1.0 mm.

2. Integrated optical chip according to claim 1, wherein the lateral surfaces of the chip have an electrically conductive coating.

3. Integrated optical chip according to claim 1, wherein the chip comprises lithium niobate.

4. Integrated optical chip according to claim 3, wherein the substrate material comprises a ceramic/thermoset polymer composite.

5. Integrated optical chip according to claim 1, wherein the substrate material comprises the same material as that of the chip.

6. Integrated optical chip according to claim 1, wherein the chip is attached to the substrate with adhesive.

7. Integrated optical chip according to claim 6, wherein the adhesive comprises epoxy resin.

8. Integrated optical chip according to claim 1, wherein the electrically conductive path comprises a metallised layer.

9. Integrated optical chip according to claim 1, wherein the thickness of the chip is less than 0.5 mm.

10. Integrated optical chip according to claim 1, wherein the thickness of the chip is less than 0.25 mm.

11. Method of manufacturing an integrated optical chip, the chip having a crystalline structure cut along parallel principal crystallographic planes and a thickness of less than 1.0 mm, an optical signal pathway being disposed in one of the cut surfaces of the chip, the method comprising the steps of:
   (i) forming at least one optical signal pathway in a first surface of a crystalline wafer cut along parallel principal crystallographic planes to a thickness less than 1 mm;
   (ii) applying an electrically conductive layer in direct contact with te a second surface of the crystalline wafer opposite to that of the optical signal pathway;
   (iii) attaching a substrate material slab to the said conductive layer on the said crystalline wafer, said slab having a thickness up to 1.0 mm, the same crystallographic orientation as the crystalline wafer and similar coefficients of thermal expansion to the said wafer in the said principal crystallographic plane;
   (iv) dicing a composite chip on substrate from the wafer-slab structure, the said composite chip comprising a substrate and at least one optical signal pathway extending generally longitudinally with respect to the composite chip; and
   (v) applying an electrically conductive path to lateral surfaces of the said composite chip and in contact with said electrically conductive layer;
and wherein said electrically conductive layer is capable of both preventing charge differentials from developing across the surfaces of the optical chip and preventing the substrate material slab from affecting the transverse resonant frequency of the chip.

12. Method of mounting an integrated optical chip on a substrate according to claim 11, wherein the surface of the composite chip on which the optical signal pathway is formed and the longitudinal end surfaces between which the optical signal pathway extends are masked prior to applying an electrically conductive path.

13. Method of mounting an integrated optical chip on a substrate according to claim 11, wherein the crystalline wafer comprises lithium niobate.

14. Method of mounting an integrated optical chip on a substrate according to claim 13, wherein the substrate material comprises a ceramic/thermoset polymer composite.

15. Method of mounting an integrated optical chip on a substrate according to claim 11, wherein the substrate material comprises the same material as that of the chip.

16. Method of mounting an integrated optical chip on a substrate according to claim 11, wherein the chip is bonded on the substrate with adhesive.

17. Method of mounting an integrated optical chip on a substrate according to claim 16, wherein the electrically conductive layer comprises a metallised grounding plane and the adhesive comprises epoxy resin.

18. Method of mounting an integrated optical chip on a substrate according to claim 17, wherein the metallised grounding plane is deposited by an electron beam evaporation process.

19. Method of mounting an integrated optical chip on a substrate according to claim 16, wherein the adhesive is electrically conductive.

20. Method of mounting an integrated optical chip on a substrate according to claim 11, wherein the electrically conductive path comprises a metallised layer.

21. Method of mounting an integrated optical chip on a substrate according to claim 20, wherein the metallised layer comprises a composite layer of two metals selected from the group consisting of titanium, gold, aluminium, nickel, chromium and tungsten.

22. Method of mounting an integrated optical chip on a substrate according to claim 20, wherein the metallised layer is deposited by an electron beam evaporation process.

* * * * *